(12) United States Patent
Johnson et al.

(10) Patent No.: US 7,640,068 B2
(45) Date of Patent: Dec. 29, 2009

(54) SURVEYING INSTRUMENT AND METHOD OF CONTROLLING A SURVEYING INSTRUMENT

(75) Inventors: Johan Johnson, Vallentuna (SE); Anneli Utterback, Rimbo (SE)

(73) Assignee: Trimble AB, Danderyd (SE)

( * ) Notice: Subject to any disclaimer, the term of this patent is extended or adjusted under 35 U.S.C. 154(b) by 182 days.

(21) Appl. No.: 11/767,742

(22) Filed: Jun. 25, 2007

(65) Prior Publication Data

US 2008/0004808 A1   Jan. 3, 2008

(30) Foreign Application Priority Data

Jul. 3, 2006   (EP) .................................. 06013742

(51) Int. Cl.
G05B 19/18 (2006.01)
G01C 3/08 (2006.01)
G11C 1/00 (2006.01)
G01B 11/26 (2006.01)

(52) U.S. Cl. ............................. 700/62; 700/58; 700/59; 250/204; 250/205; 250/201.2; 324/330; 324/373; 356/4.1; 356/4.03; 356/4.07; 356/139.1; 356/141.1

(58) Field of Classification Search .................. 356/4.1, 356/4.03, 4.07, 141.1–141.4, 4.01, 139.1, 356/139.04; 250/204–205, 201.2; 700/58, 700/59, 62; 324/330, 373
See application file for complete search history.

(56) References Cited

U.S. PATENT DOCUMENTS

| | | | | |
|---|---|---|---|---|
| 4,829,172 A | * | 5/1989 | Miller | 250/205 |
| 6,450,267 B2 | * | 9/2002 | Ohtomo et al. | 172/4.5 |
| 6,563,574 B2 | * | 5/2003 | Ohtomo et al. | 356/141.1 |
| 6,782,015 B1 | * | 8/2004 | Kawatani et al. | 372/24 |
| 2002/0138998 A1 | * | 10/2002 | Hamada | 33/290 |
| 2004/0246462 A1 | * | 12/2004 | Kaneko et al. | 356/5.1 |
| 2005/0125770 A1 | * | 6/2005 | Arsenault et al. | 717/104 |

FOREIGN PATENT DOCUMENTS

| | | |
|---|---|---|
| EP | 1030163 A2 | 8/2000 |
| EP | 1061335 A2 | 12/2000 |
| WO | 9012284 A1 | 10/1990 |
| WO | 2004001333 A1 | 12/2003 |

OTHER PUBLICATIONS

European Search Report pertaining to EP 06013742.9 dated Dec. 18, 2006.

* cited by examiner

*Primary Examiner*—Ramesh B Patel
(74) *Attorney, Agent, or Firm*—Dinsmore & Shohl LLP

(57) ABSTRACT

A surveying instrument performs tracking of a target by controlling an orientation of a measuring unit relative to the target in two different angular directions. The control in one angular direction is based on detected light intensities which are modulated according to a first time pattern, and control of the orientation in the other angular direction is based on detected light intensities modulated according to a second time pattern just different from the first time pattern.

28 Claims, 9 Drawing Sheets

SURVEYING INSTRUMENT AND METHOD OF CONTROLLING A SURVEYING INSTRUMENT

CROSS-REFERENCE TO RELATED APPLICATIONS

This application claims the benefit of European Patent Application No. 06 013 742.9 filed Jul. 3, 2006.

BACKGROUND OF THE INVENTION

1. Field of the Invention

The present invention generally relates to surveying instruments and methods of controlling surveying instruments. The invention also relates to a computer-readable carrier embodying a program for controlling surveying instruments. In particular, the present invention relates to surveying instruments which are configured to measure angles and/or distances relative to a target.

2. Brief Description of Related Art

It is known to use surveying instruments for measuring distances between objects and angles in a coordinate system, wherein the surveying instrument is placed at a predetermined position relative to one object and wherein a suitable target is placed at a predetermined position relative to the other object, and wherein the surveying instrument performs an electro-optical measurement, such as determining a distance from the target and determining an angular position of the target within a suitable coordinate system.

From WO 90/12284 there is known a surveying instrument which is configured to perform automatic tracking of a target. The entire contents of this document are incorporated herein by reference. Thus, the surveying instrument may continuously perform measurements with even moving targets. This conventional surveying instrument has a detector which recognizes the target which is to be tracked and controls an actuator control unit such that an orientation of the measuring unit relative to a base is maintained such that the target is always at a center of a field of view of the detector. A problem might arise if a second target, which should not be tracked, appears within the field of view of the detector, where it might happen that the instrument then continues tracking with respect to the second target rather than the first target which should be tracked.

SUMMARY OF THE INVENTION

The present invention has been accomplished taking the above problems into consideration.

Embodiments of the present invention provide a method of controlling a surveying instrument and a surveying instrument which are better suitable for tracking targets.

Embodiments of the present invention provide surveying instruments and control methods which are improved with respect to maintaining tracking of a desired target even when another target is located within a field of view of a tracking detector.

According to an embodiment of the present invention, a surveying instrument comprises a base, a measuring unit mounted relative to the base, and a actuator control unit for controlling an orientation of the measuring unit relative to the base. An embodiment of a control method for such surveying instrument comprises receiving first light through a lens of the measuring unit and forming a first spot of the first light on the detector, wherein the first light is modulated light having an intensity which is modulated according to a first time pattern; receiving second light through the same lens and forming a second spot of the second light on the detector, wherein the second light is modulated light having an intensity which is modulated according to a second time pattern; processing light intensity signals produced by the plural detector segments based on the first and second time patterns and generating a first control signal indicative of a position of the first spot on the detector, and a second control signal indicative of a position of the second spot on the detector; controlling, in a first control mode, the actuator control unit to change the orientation of the measuring unit relative to the base in a first angular direction based on the first signal and to change the orientation of the measuring unit relative to the base in a second angular direction based on the second signal.

This method includes using two types of light having intensities which are modulated according to different time patterns. The modulation of the light according to known time patterns allows the measuring instrument to distinguish light modulated according to the first time pattern from light modulated according to the second time pattern and also from other light received by the surveying instrument through the same lens and detected by the same detector. The received light may include stray light and light originating from other objects within a field of view of the detector of the surveying instrument.

According to a particular embodiment of the present invention, the surveying instrument is configured to produce light having an intensity which is modulated according to a predetermined first time pattern. This light is emitted towards a target which includes a suitable reflector to reflect back incident light towards the surveying instrument such that the surveying instrument receives the light modulated according to the first time pattern and reflected back from the reflector of the target. Such target including a reflector is also referred to as a passive target in the art.

According to a further particular embodiment of the present invention, the surveying instrument and control method are suitable for measurements involving a target which includes a light source emitting light which is modulated according to a predetermined second time pattern. The surveying instrument may then receive the light modulated according to the second time pattern produced by and originating from the light source of the target. Such target is also known as an active target in the art.

According to an exemplary embodiment, the surveying instrument according to the present invention is configured to perform measurements relative to a combination of an active target and a passive target. For example, the target may include both a reflector for reflecting measuring light produced by the surveying instrument and having an intensity modulated according to a first time pattern, and a light source for emitting light having an intensity modulated according to a second time pattern. The surveying instrument may then receive both the light modulated according to the second time pattern generated by the active target and the light modulated according to the first time pattern generated by the surveying instrument and reflected back from the passive target.

According to an embodiment of the present invention, the surveying instrument and control method use the light modulated according to a first time pattern for controlling an orientation of the measuring unit relative to the base in a first angular direction, and use the light modulated according to a second time pattern for controlling the orientation of the measuring unit relative to the base in a second angular direction which is different from the first angular direction. Such usage of the different types of light for controlling the orientation of the measuring unit in different angular directions may allow for a robust tracking of a desired target.

According to an exemplary embodiment of the invention, the measuring unit comprises a detector having plural detector segments, and the measuring unit also comprises a lens to receive the light originating from the target and to form a spot of the light on the detector. Depending on a position of the target relative to the measuring unit, the spot may be formed on one or the other detector segment, or the spot may be formed such that it covers portions of one or more detector segments.

Intensity signals produced by the detector segments are processed to generate a first control signal for driving a first actuator, such as a servo or motor, for orienting the measuring unit relative to the base in the first angular direction, and to generate a second control signal for controlling a second actuator for orienting the measuring unit relative to the base in the second angular direction.

According to an exemplary embodiment, the processing includes distinguishing the first spot formed of the first light from the second spot formed of the second light based on the different time patterns according to which the first light and the second light are modulated.

According to an exemplary embodiment, the controlling of the actuators is performed such that at least one of the first and second spots covers portions of at least two detector segments. For example, the controlling may be performed such that light intensities detected by the at least two detector segments are about equal. In such situation, a center of the spot will be located close to a insulated barrier between the at least two detector segments. Such configuration allows detection of displacements of the spot on the detector with a relatively high accuracy.

According to a particular embodiment herein, the detector comprises four adjacent detector segments which are arranged such that the spot may simultaneously cover a portion of each of the four detector segments.

According to a further exemplary embodiment herein, the controlling is performed such that the spot formed from one of the first and second lights covers portions of all four detector segments and the spot formed of the other of the first and second measuring lights covers portions of only two of the four detector segments.

The embodiments illustrated above are particularly useful for tracking a desired target, which requires that the desired target generates a suitable spot on the detector. The control mode for performing the tracking will be referred to as the first control mode in the following.

According to an exemplary embodiment of the present invention, the control method and surveying instrument have a second control mode, in which the actuators change the orientation of the measuring unit relative to the base in both the first and second angular directions based on only one of the spots formed of the first light modulated according to the first time pattern and the second light modulated according to the second time pattern.

According to an exemplary embodiment herein, the detector comprises at least two groups of detector segments, wherein a central group of detector segments is disposed in a central region of the detector, and wherein a peripheral group of detector segments is disposed in a peripheral region of the detector.

According to an exemplary embodiment herein, control signals for controlling the actuators are derived from the central group of detector segments in the first control mode, and they are derived from the peripheral group or both the central and peripheral groups of detector segments in the second control mode.

According to a further exemplary embodiment herein, the first control mode is used when a spot is formed on portions of the central group of detector segments, and the second control mode is performed when a spot covers portions of the peripheral group of detector segments.

According to an exemplary embodiment of the invention, the processing for distinguishing the first light from the second light based on the different modulation time patterns uses quadrature processing.

A further embodiment of the present invention provides a computer readable carrier containing information representing a program adapted to cause a control system of a surveying instrument to execute a control method as illustrated above. The computer readable carrier can be any suitable type of carrier such as a solid state memory, a magnetic memory, an optical memory, other type of memory or modulated wave-signals, e.g. radio frequency, audio frequency, optical frequency, modulated waves/signals suitable for being transmitted through any suitable network, such as the internet.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
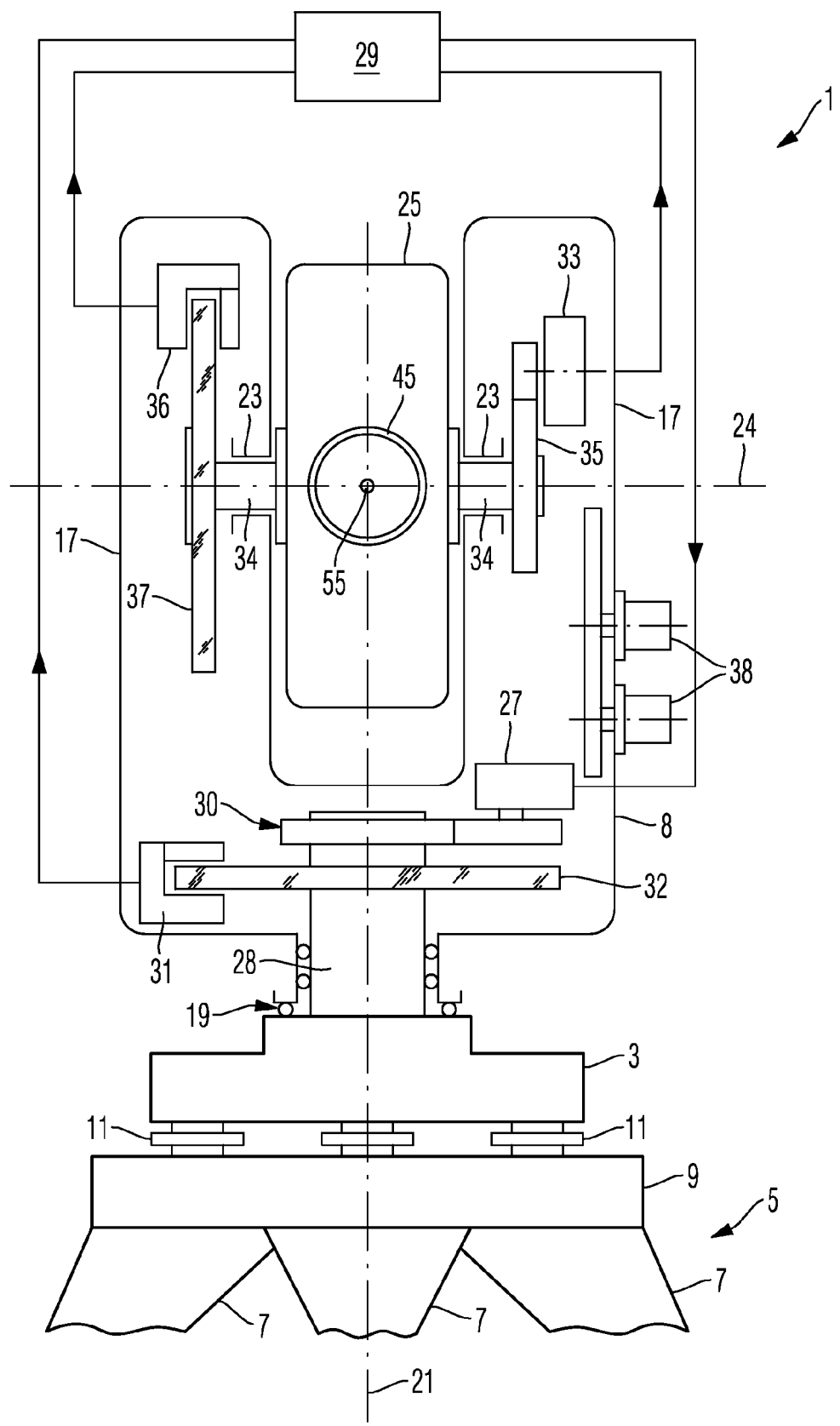
FIG. 1 illustrates a surveying instrument according to an embodiment of the invention.

FIG. 1 is an illustration of a surveying instrument which may be used according to embodiments of the invention. The surveying instrument 1 is a electro-optical distance measuring instrument which is also referred to as a total station in the art. The instrument is mounted on a base 3 of a tripod 5. The tripod 5 comprises three legs 7 attached to a plate 9. The base 3 is mounted on the plate 9 by three screws 11 allowing leveling of the base 3 relative to a ground on which the legs are placed.

The base 3 carries a swivel arrangement comprising a pair of brackets 17 mounted on the base 3 by a bearing arrangement 19 such that the pair of brackets 17 is rotatable relative to the base 3 about a vertical axis 21. A bearing 23 is provided in each of the brackets 17 to define a common horizontal axis 24 about which an optical measuring unit 25 is rotatable.

An actuator arrangement, such as a motor arrangement 27 carried by the brackets 17 engages with a pin 28 fixed to the base 3 through a gear train 30 for rotating the measuring unit 25 about the vertical axis 21 by actuation of the motor arrangement 27 controlled by a control system 29 of the surveying instrument 1.

An orientation of the measuring unit 25 about the vertical axis 21 is detected by a sensor 31 reading an angular position relative to an encoder disk 32 fixed to the pin 28. Orientation measuring signals generated by the sensor 31 are supplied to the control system 29.

A motor arrangement 33 carried by the brackets 17 engages with an axis 34 of the optical measuring unit 25 through a gear train 35 for rotating the measuring unit 25 about the horizontal axis 24 by actuation of the motor arrangement 33 controlled by the control system 29.

An orientation of the measuring unit 25 about the horizontal axis 24 is detected by a sensor 36 reading an angular position relative to an encoder disk 37 fixed to the axis 34. Orientation measuring signals generated by the sensor 36 are supplied to the control system 29.

Control knobs 38 operable by a user are provided on an outer surface of one of the brackets 17 for instructing the control system 29 to perform swivel movements of the optical measuring unit about the vertical and horizontal axes 21, 24.

The measuring unit may have a basic confirmation as known from WO 2004/001333 A1, the full disclosure of which is incorporated herein by reference.

Figure 2:
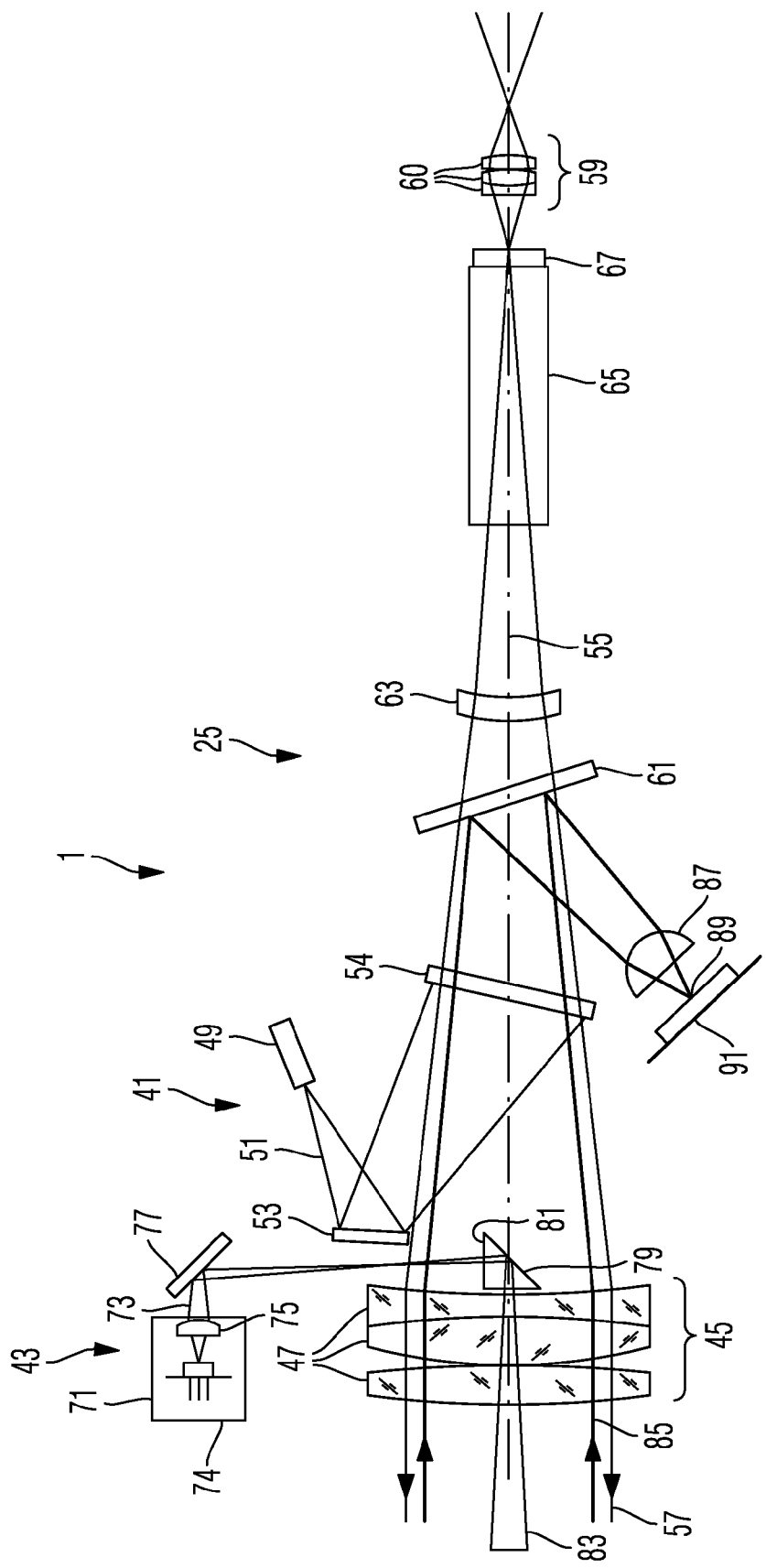
FIG. 2 is a schematic diagram illustrating a beam path of a measuring unit included in the surveying instrument shown in FIG. 1.

A functional diagram of the measuring unit 25 according to the illustrated embodiment is illustrated in FIG. 2. The measuring unit 25 comprises an electro-optical distance measuring system 41 and an optical tracking system 43. Both the distance measuring system and the tracking system 43 use common optical components, such as an objective lens 45 comprising plural lens elements 47.

The distance measuring system 41 comprises a light emitting element 49, such as an infrared LED, for emitting a distance measuring beam 51 which is reflected from a mirror 53. The beam 51 reflected from the mirror 53 is reflected from a semi-transparent plate 54 disposed such that a portion of the beam 51 reflected from semi-transparent plate 54 is directed through the lens 45 parallel to an optical axis 55 of the lens 45. The lens 45 forms a beam 57 of distance measuring light emitted from the measuring unit 25.

If the beam 57 of the distance measuring light is incident on a reflecting target, a portion of the distance measuring light reflected off from the target will be received by the measuring unit through the lens 45, and this light is incident on a detector (not shown in FIG. 2) such that detection signals produced by the detector can be processed for determining a distance of the reflecting target from the measuring unit 25. Processing of the detection signals may include evaluation of a phase error between a light intensity emitted by the light emitting element 49 and an intensity received by the detector, or by any other optical distance measuring method well-known in the art.

For this purpose, the measuring unit 25 has to be suitably oriented relative to the base 3 such that the emitted beam 57 of measuring light is incident on the reflector. The corresponding orientation of the instrument may be adjusted manually by a user looking through an eye piece 59 comprising plural lens elements 60 and which produces an image of a scenery within a field of view of the objective lens 45. Light originating from the scenery traverses the objective lens 45, the semitransparent plate 54, a further semitransparent plate 61, a focusing lens 63, a porro prism 65 and a reticle 67 disposed upstream of the eye piece 59 in the optical beam path of the measuring unit 25. The user may operate the knobs 38 for controlling the orientation of the measuring unit 25 such that a desired reflector is located within the field of view. Thereafter, the user may start a distance measurement using the distance measuring system 41.

Apart from such manual operation, the surveying instrument 1 is also configured to automatically orient the measuring unit 25 towards a desired target and to maintain such orientation towards the target also when the target is moving relative to the surveying instrument 1.

For this purpose, the tracking system 43 comprises a source 71 of tracking light 73, comprising a semiconductor laser 74 and a collimating lens 75. The tracking light 73 emitted from the source 71 is reflected from a mirror 77, and is then reflected from a reflecting surface 79 of a prism 81 disposed close to a lens element 47 of the objective lens 45 and such that the prism 81 is traversed by the optical axis 55. The tracking light 73 reflected from surface 79 traverses the objective lens 45 and is emitted from the measuring unit as a slightly diverging tracking beam 83.

Tracking light reflected from a target or tracking light emitted by a target is indicated in FIG. 2 as a beam 85 received through the objective lens 45. Such received tracking light traverses semitransparent plate 54, is reflected off from semitransparent plate 61 and is focused by a focusing optics 87 to form a spot 89 of tracking light on a tracking detector 91. Detection signals of detector 91 are processed for generating control signals for the motors 27 and 33 as will be further illustrated herein below.

Figure 3:
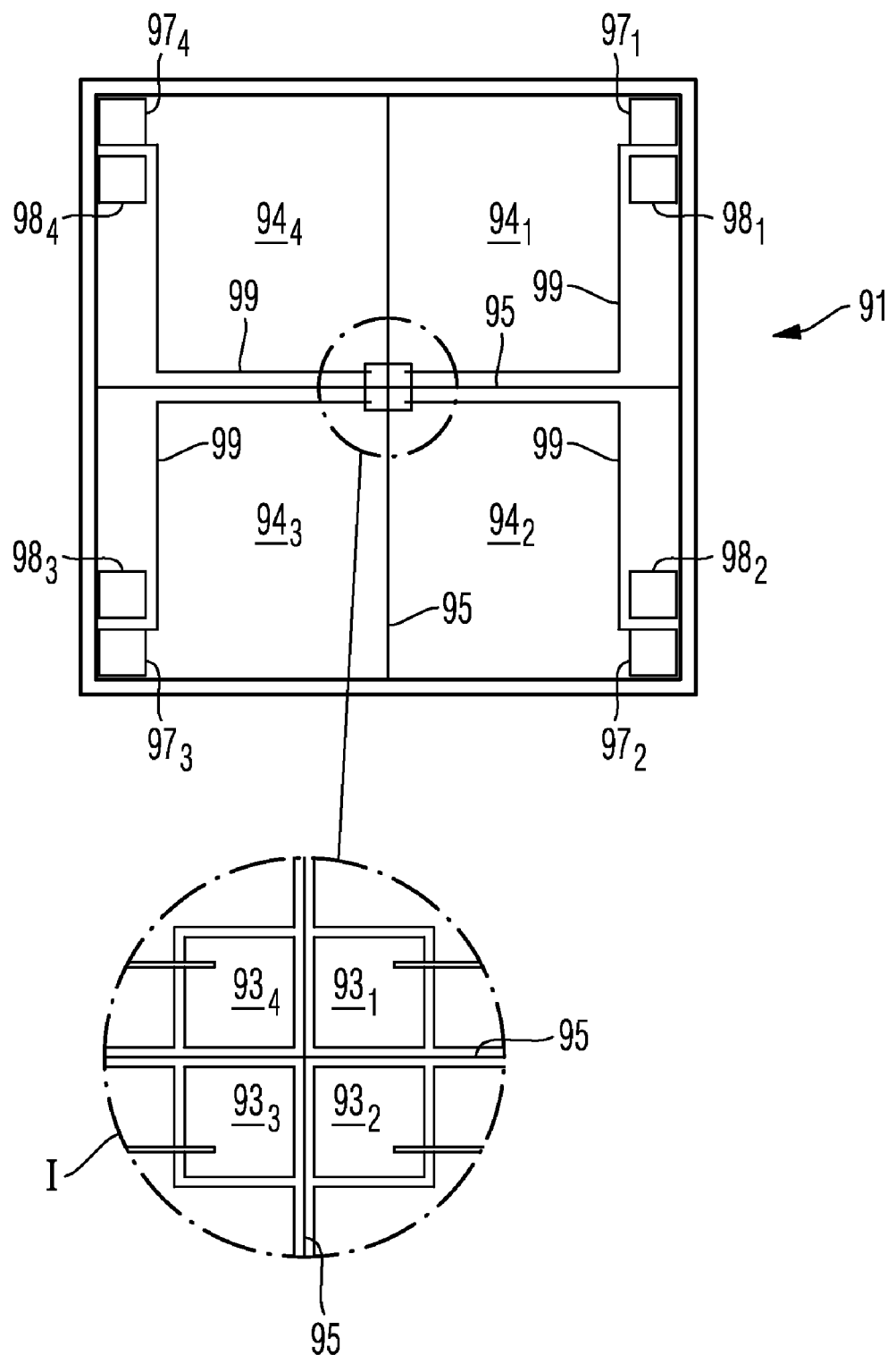
FIG. 3 is an elevational view of a detector included in the measuring unit shown in FIG. 2.

FIG. 3 shows an evelational view of the tracking detector 91, wherein a central portion of the detector 91 is shown in more detail as an enlarged insert I. The tracking detector 91 is a four-quadrant-type-detecor, comprising eight detector segments which are arranged as a peripheral group of four detector segments and a central group of four detector segments. The central group comprises segments $93_1$, $93_2$, $93_3$, $93_4$ which are arranged as shown in FIG. 3, forming a rectangular array having two rows and two columns. The detector segments $93_1$, $93_2$, $93_3$, $93_4$ are each square-shaped and separated from each other by a cross-shaped insulating barrier 95.

The peripheral group of detector segments comprises four segments $94_1$, $94_2$, $94_3$, $94_4$, which are disposed relative to each other in a similar pattern as the central detector segments $93_1$ to $93_4$. In particular, the detector segments $94_1$ to $94_4$ are arranged in a rectangular array having two rows and two columns. The detector segments $94_1$ to $94_4$ of the peripheral group are substantially square-shaped and separated from each other by the cross-shaped insulating barrier 95.

A lateral extension of the detector 91 may be configured such that it corresponds to a field of view of a telescope provided by the objective lens. A lateral extension of the detector segments $93_1$ to $93_4$ of the central group is substantially smaller, for example ten times smaller, than a lateral extension of the detector segments $94_1$ to $94_4$ of the peripheral group.

The detector segments $94_1$ to $94_4$ of the peripheral group deviate from an exactly rectangular shape in that central edges of the respective rectangles are covered by the detector segments $93_1$ to $93_4$ of the central group. Further, each detector segment $94_1$ to $94_4$ has a respective contact pad $98_1$, $98_2$, $98_3$, $98_4$ which can be contacted to supply a detected light intensity signal from each of the peripheral detector segments $94_1$ to $94_4$ to a signal processing unit 101 (see FIG. 4) of the control unit 29.

Each of the detector segments $93_1$ to $93_4$ of the central group is connected through a signal line 99 to a respective contact pad $97_1$ to $97_4$ disposed in one of the detector segments $94_1$ to $94_4$ at a peripheral portion of the detector 91, wherein the contact pads $97_1$ to $97_4$ may be contacted to supply detected light intensity signals from the central detector segments $93_1$ to $93_4$ to the processing unit 101.

Figure 4:
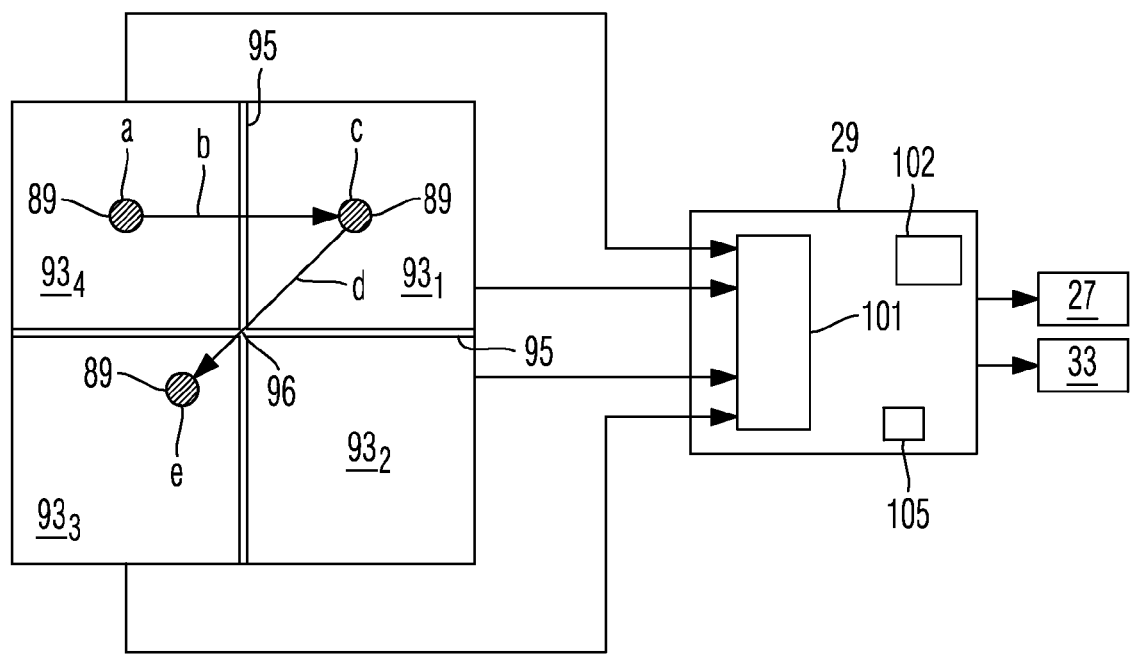
FIG. 4 is a schematic diagram illustrating processing of detector signals.

FIG. 4 is a schematic illustration of the arrangement of the detector segments $93_1$ to $93_4$ of the central group connected to the processing unit 101 which is a component of the control system 29. The detected light intensity signals are processed by the processing unit 101 and further units of the control system to generate control signals for controlling the motors 27 and 33.

Reference numeral 102 in FIG. 4 schematically represents a memory for storing a program which instructs a processing unit 105 of the control system 29 to perform the processing according to a homing mode and a tracking mode illustrated below.

FIG. 4 further illustrates a function of the surveying instrument 1 by indicating a spot 89 of tracking light which is initially formed at a position (a) such that the spot 89 covers a portion of detector segment $93_4$. The spot 89 is then moved along a path (b) such that it is formed at a position (c), covering a portion of detector segment $93_1$, and the spot 89 is thereafter moved along a path (d) to be disposed at a position (e), covering a portion of detector segment $93_3$.

Figure 5:
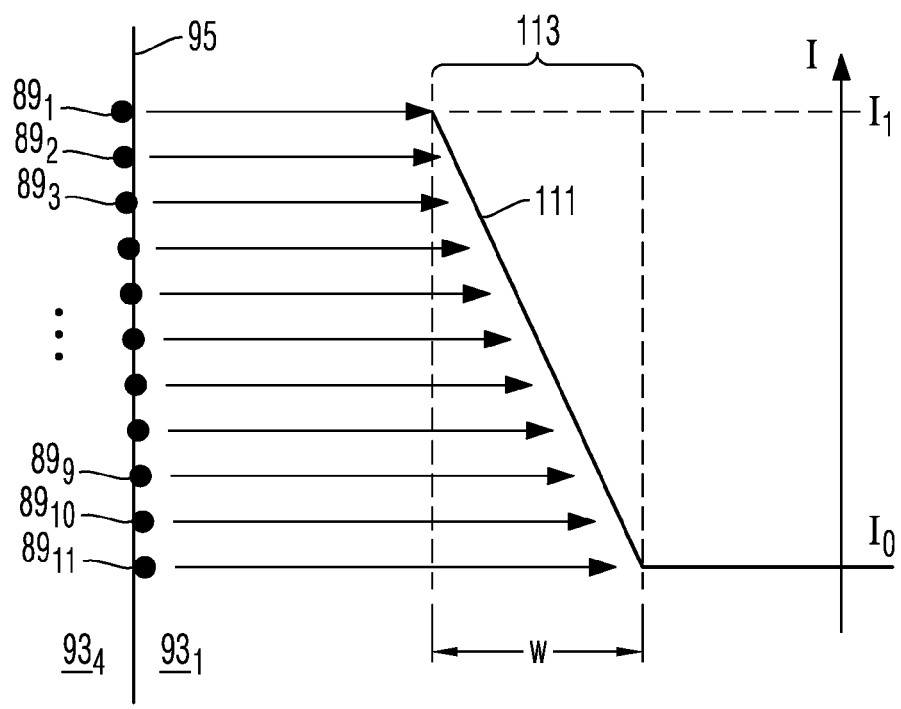
FIG. 5 is a diagram for illustrating a function of the detector included in the surveying instrument shown in FIG. 1.

When the spot 89 moves along the path (b), the spot is at first only incident on detector segment $93_4$, it will then traverse the insulating barrier 95, and it will be only incident on detector element $93_1$ thereafter. While traversing the insulating barrier 95, the spot 89 is incident on both detector segments $93_4$ and $93_1$ FIG. 5 illustrates such movement of the spot 89 from detector segment $93_4$ to detector segment $93_1$ Herein, reference numerals $89_1$ to $89_{11}$ indicate the spot at plural subsequent times, wherein reference numeral $89_1$ indicates the spot which is completely incident on detector segment $93_4$ since it covers a portion of only detector segment $93_4$, and wherein reference numeral $89_{11}$ indicates the spot having traversed the insulating barrier 95 and being completely incident on detector segment $93_1$. Reference numerals $89_2$ to $89_{10}$ indicate intermediate spot positions wherein the spot covers portions of both detector segments $93_4$ and $93_1$.

A line 111 shown in FIG. 5 illustrates a light intensity I detected by detector segment $93_4$ during such movement of the spot 89. When the spot is at the position indicated by $89_1$, i.e. completely within detector segment $93_4$, the intensity detected by segment $93_4$ is a maximum intensity $I_1$. Thereafter, during movement of the spot to the position indicated by $89_{11}$, the intensity detected by segment $93_4$ will be continuously reduced to a minimum intensity 10 within a range 113. A width (w) of the range 113 corresponds to a diameter of spot 89 formed on the detector 91.

The processing unit 101 receives from each detector segment a signal which is indicative of a light intensity detected by the respective detector segment. The processing unit 101 performs a processing of the detected light intensities by determining a horizontal error signal $S_h$ and a vertical error signal $S_v$ representing a deviation of a position of the spot 89 from a region close to a center 96 of the detector. The error signals $S_h$ and $S_v$ are determined as follows:

$$S_h = [I(93_4) + I(93_3)] - [I(93_1) + I(93_2)] \quad (1)$$

$$S_v = [I(93_4) + I(93_1)] - [I(93_3) + I(93_2)] \quad (2)$$

wherein $I(93_1)$ to $I(93_4)$ represent the light intensities detected by the respective detector segments $93_1$ to $93_4$.

Herein, the error signal $S_v$ has a positive value when the spot 89 is located in the upper half of the detector, i.e. within detector segments $93_4$ and $93_1$, and $S_v$ has a negative value when the spot is located in the lower half of the detector, i.e. within detector segments $93_3$ and $93_2$. Further, the horizontal error signal $S_h$ has a positive value if the spot 89 is located in the left half of the array formed by the central group of detector segments, i.e. within detector segments $93_4$ and $93_3$. Similarly, the horizontal error signal $S_h$ has a negative value when the spot 89 is located within one of detector segments $93_1$ and $93_2$.

Figure 6:
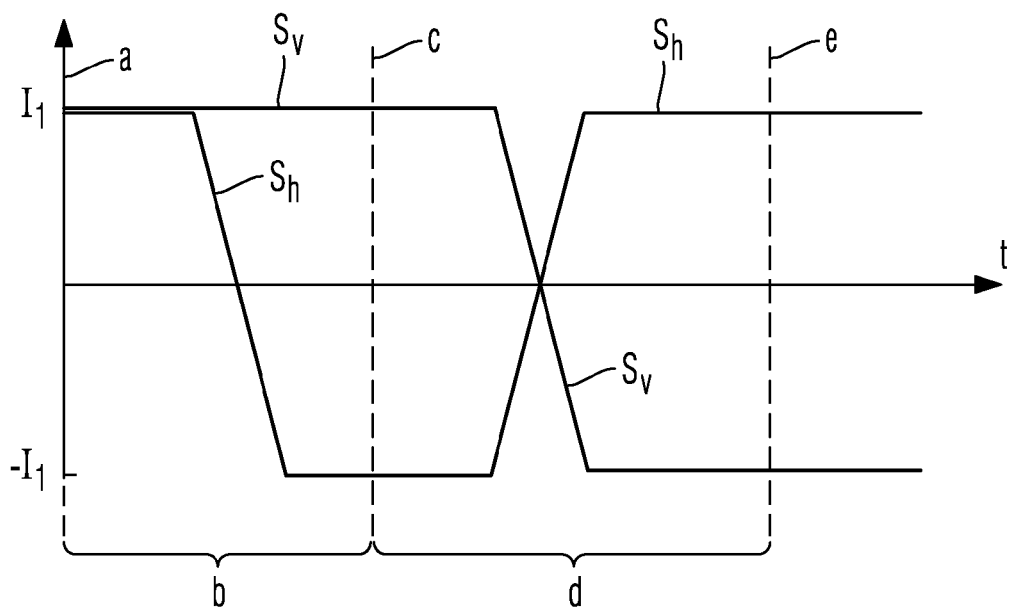
FIG. 6 is a schematic diagram for illustrating the processing of detector signals in an embodiment of the present invention.

FIG. 6 is a schematic illustration of a time development of error signals $S_h$ and $S_v$ during a movement of the spot 89 as illustrated in FIG. 4, i.e. from position (a) along path (b) to position (c) and along path (d) to position (e). It is apparent from FIG. 6 that the horizontal error signal $S_h$ changes sign when the spot 89 traverses the vertical insulating barrier 95 along path (b) and also when the spot traverses the center 96 of the detector 91 along path (d). Further, the vertical error signal $S_v$ changes sign only when the spot 89 traverses the center 96 of the detector 91 along path (d). Thus, a value of zero of both the horizontal and vertical error signals $S_h$, $S_v$ is indicative that the spot 89 is exactly located on the center 96 of the detector 91.

The horizontal and vertical error signals $S_h$, $S_v$ determined by the processing unit 101 can be further processed to generated control signals for driving the motors 27 and 33. For example, the horizontal error signal $S_h$ may form a basis for controlling motor 27 in that the motor 27 is driven in one suitably chosen direction if the error signal $S_h$ is positive, and motor 27 is driven in the other direction if $S_h$ is negative, and motor 27 is not driven at all, if the absolute value of $S_h$ is less than a suitably chosen low threshold.

Similarly, the motor 33 can be controlled based on the vertical error signal $S_v$. For example, the motor 33 is driven in one suitably chosen direction 11 if the error signal $S_v$ is positive, motor 33 is driven in the other direction if $S_v$ is negative, and motor 33 is not driven at all, if the absolute value of $S_v$ is below a suitably chosen threshold.

Figure 7:
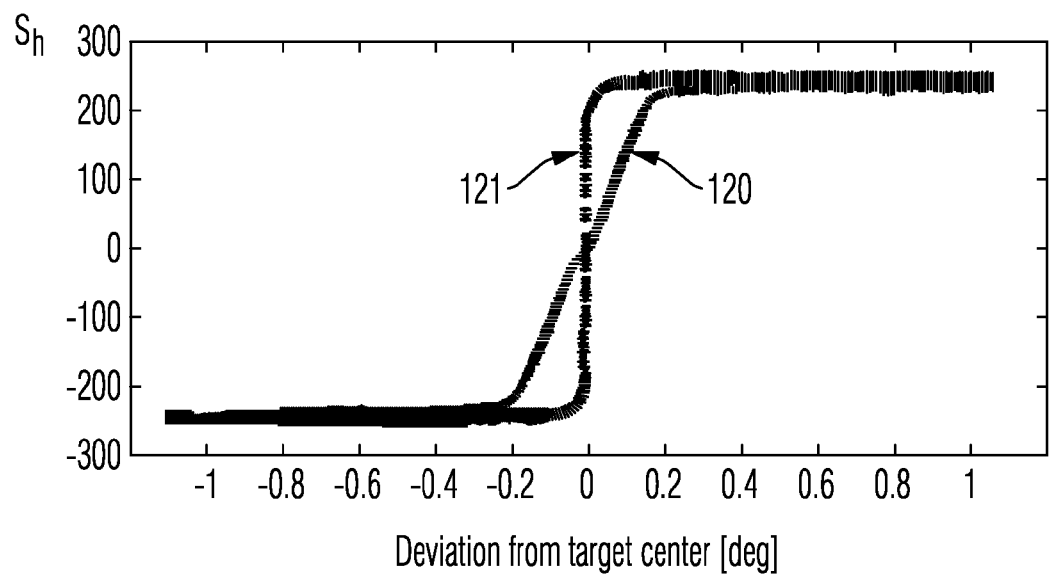
FIG. 7 is a graphical representation of data which may be obtained from the detector shown in FIG. 3.

FIG. 7 shows exemplary data of a detected horizontal error signal $S_h$ obtained with two different targets while performing a horizontal scan of the measuring unit, wherein the target is assumed to be located at a angular position of 0° relative to the surveying instrument 1. The angular deviation from the target is indicated on the horizontal axis, and the vertical axis indicates the detected corresponding horizontal error signal $S_h$ in arbitrary units. Two sets of data are shown in FIG. 7: a first set of data indicated by reference numeral 120 is obtained from a measurement where the target is disposed at a distance of 2.5 m from the surveying instrument 1, and a second group 121 of data is obtained from a measurement where the target is disposed at a distance of 60 m from the surveying instrument 1. It is apparent from FIG. 7 that the distance of the target from the surveying instrument 1 has a significant effect on a slope of the data values around 0° deviation from the target. This can be explained as follows: as illustrated above with reference to FIG. 5, the width (w) of the region 113 in which the detected light intensity of one detector segment changes when the spot traverses the insulating barrier depends on a diameter of the spot 89. However, the diameter of the spot formed on the detector depends on a distance of the target from the detector. In particular, a target which is disposed closer to the surveying instrument will cover a larger portion of the field of view of the surveying instrument than a target disposed further away from the instrument. Thus, the target disposed closer to the instrument will form a greater spot on the detector than the target disposed further away from the instrument, and it is apparent that the slope of the data set 120 around 0° is less than the slope of the data set 121 due to the different spot sizes generated by the same target at different distances from the surveying instrument.

Figure 9:
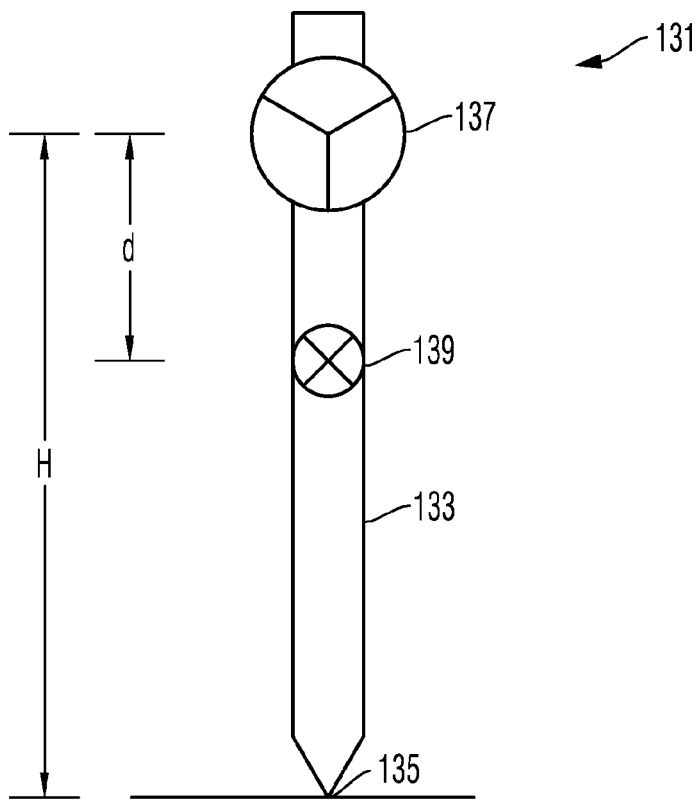
FIG. 9 is a schematic illustration of a target which may be used in embodiments of the present invention.

FIG. 9 schematically shows a combined target 131 which may be used for measurement according to the present invention. The combined target 131 comprises a pole 133 having a bottom end 135 to be placed on an object, the position of which should be determined relative to the surveying instrument. The combined target 131 further comprises a prism 137 mounted on the pole 133 such that a center of the prism 137 is disposed at a distance H from the bottom end of the pole. The prism 137 is configured to form a reflector for a tracking light beam 83 emitted by the surveying instrument 1 and for a distance measuring light beam 57 emitted by the surveying instrument. The reflector 137 forms a passive target for the tracking system 43 of the surveying instrument 1. The combined target 131 further comprises a LED light source 139 mounted on the pole 133 and positioned at a distance (d) below the center of the reflector 137. The LED light source 139 emits light modulated according to a predetermined pattern such that the light source 139 forms an active target for the tracking system 43.

Figure 8A:
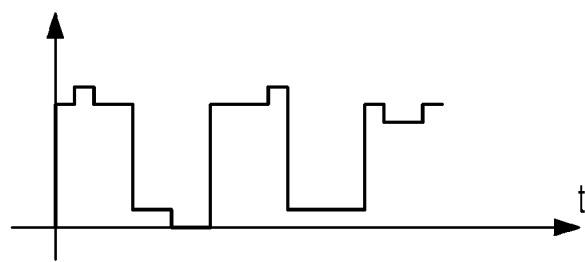
FIGS. 8a to 8f are schematic illustrations of various signals involved in processing of detector signals in an embodiment according to the present invention.
Figure 8B:
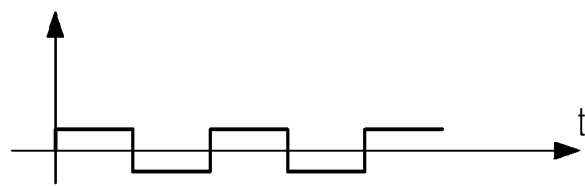
Figure 8C:
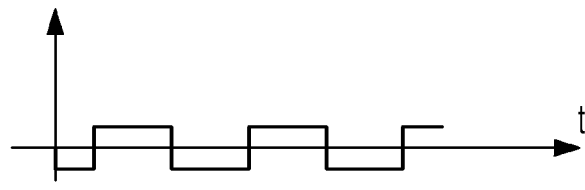
Figure 8D:
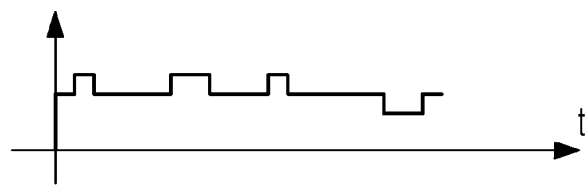
Figure 8E:
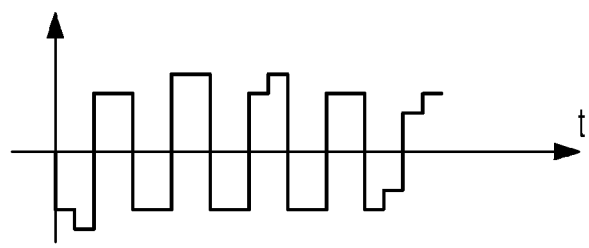

Each of the active and passive targets 139, 137 generates a spot of light on the detector 91. The processing unit 101 is configured to generate separate signals which are indicative of a position of the spot generated by the passive target 137 and of the spot generated by the active target 139. Such processing can be performed as illustrated with reference to FIG. 8 as follows: FIG. 8a schematically illustrates a time dependency of a detected light intensity associated with the active target 139. The detected light intensity is modulated according to a predetermined known frequency and includes noise. While the frequency of the modulation is known at the surveying instrument, the relative phase of such modulation is unknown at the surveying instrument. Therefore, quadrature detection is performed for determining an intensity of the received light originating from the active target 139. FIG. 8b illustrates a 0° out of phase control signal generated by the processing unit 101, and FIG. 8c shows a 90° out of phase control signal generated by the processing unit 101. FIG. 8d shows the detected intensity of FIG. 8a multiplied by the 0° out of phase control signal of FIG. 8b, and FIG. 8e shows the detected light intensity signal of FIG. 8a multiplied by the 90° out of phase control signal of FIG. 8c. The signals of FIGS. 8d and 8e can be generated by conventional synchronous rectifiers.

Figure 8F:
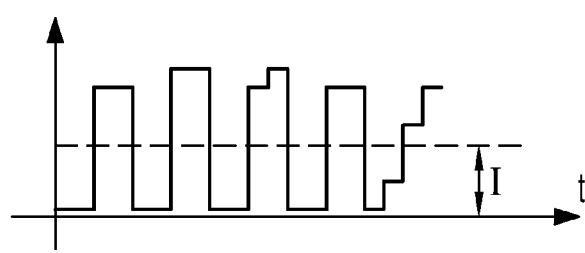

FIG. 8f shows a sum of the rectified signals shown in FIGS. 8d and 8e. An intensity signal I representing an intensity of the light received from the active target 139 can be obtained by low path filtering of the signal shown in FIG. 8f.

Since the light reflected from the passive target 137 is generated by the tracking system 43, also a phase of the corresponding received light is known at the surveying instrument. Therefore, quadrature detection is not necessary for such light, and a signal representing the intensity of the light received from the passive target 137 may be derived by conventional synchronous rectification.

Thus, it is possible to distinguish a spot formed on the detector of light reflected from the passive target 137 from a spot formed on the detector of light emitted by the active target 139. For this purpose it is sufficient that the time patterns of modulation of the light from the active target 139 is different from the modulation time pattern of the light of the passive target 137.

An advantageous selection of the time patterns is achieved when the modulation frequency of the active target differs by one octave from the modulation frequency of the passive target. For example, the modulation frequency of the active target may be 6.500 Hz and the modulation frequency of the passive target may be 13.000 Hz.

Further, plural different combinations of modulation time patterns can be provided for selection by the user. The availability of different selections allows one surveying instrument to cooperate with different combined targets 131 located within a scenery.

By applying the above processing, the processing unit 101 may determine horizontal and vertical error signals according to formulas (1) and (2) above from light detected by the detector segments of the central group for each of the active and passive targets. In particular, four error signals $S_v^{ca}$, $S_h^{ca}$, $S_v^{cp}$, $S_h^{cp}$ can be generated by the processing unit 101 from the detection signals of the detector segments of the central group, wherein the subscripts v and h indicate the vertical and horizontal error signals, the first superscript c indicates that the error signal is derived from the central group of detector segments, and the second superscripts a and p indicate the active and the passive target, respectively.

Similarly, corresponding error signals $S_v^{pa}$, $S_h^{pa}$, $S_v^{pp}$, $S_h^{pp}$ can be generated from detection signals of the detector segments $94_1$ to $94_4$ according to the same formulas (1) and (2) above, wherein the first superscript p indicates that the error signals are derived from the detector segments of the peripheral group.

For forming measurements with a desired combined target 131, the user first selects one of the available modulation patterns and sets the respective modulation pattern of the active target 139 on the combined target 131 and the light emission of tracking light source 71 on the surveying instrument 1.

Figure 10:
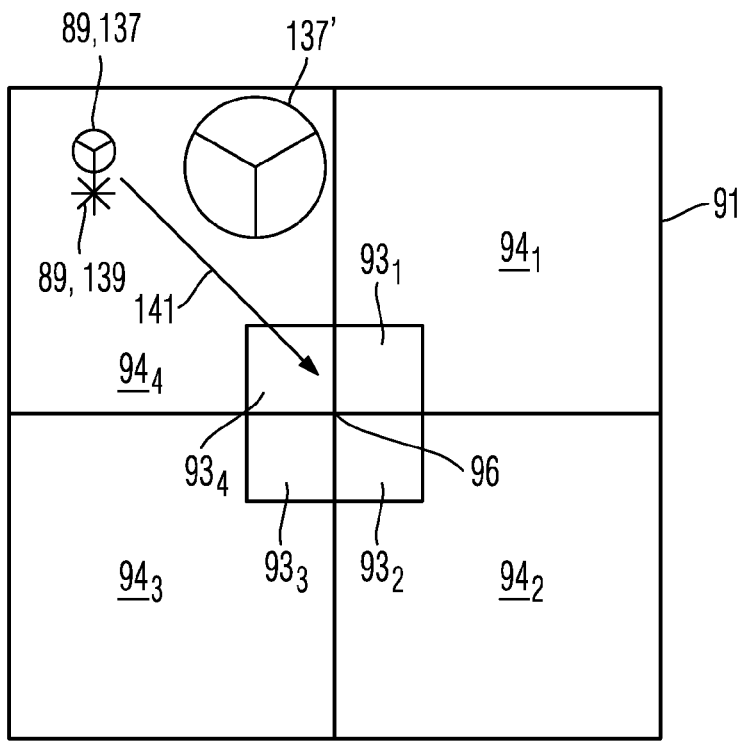
FIGS. 10 to 12 are schematic diagrams for illustration of a method according to an embodiment of the invention involving the target shown in FIG. 9.

Thereafter, the user orients the measuring unit 35 such that the combined target 131 is within the field of view of the measuring unit while looking through the eye piece 59. Such situation is schematically illustrated in FIG. 10 where each of the active and passive targets 139, 137 forms a spot of light on the detector 91. The spot formed by the light of the active target 139 is represented as an asterisk 89,139 in FIG. 10, and the spot of light formed by the passive target 137 is represented as a segmented circle 89,137 in FIG. 10.

FIG. 10 further shows a segmented circle 137' which represents a further target within the field of view of the measuring unit 25, wherein the additional target 137 is within the field of view for other reasons, and a measurement with respect to target 137' shall not be performed in the present example. However, target 137' also forms a spot of light on the detector 91, and erroneous tracking of that target 137' has to be avoided during the following measurement.

As soon as the user perceives the desired combined target 131 within the field of view, he will switch the surveying instrument to perform an automatic processing which orients the measuring unit 25 relative to the desired combined target 131 such that the spot 89,139 generated by the active target 139 is moved to the center 96 of the detector 91 as indicated by an arrow 141 in FIG. 10. Such automatic processing is referred to as "homing the target" in the following, and the control system is in a particular mode of operation referred to as a "homing mode" for performing this operation.

The homing mode, the horizontal and vertical error signals $S_h$, $S_v$ for determining drive control signals for controlling the motor 27 and 33, respectively are calculated as follows:

$$S_h = S_h^{pa} + S_h^{ca} \quad (3)$$

$$S_v = S_v^{pa} + S_v^{ca} \quad (4)$$

Figure 11:
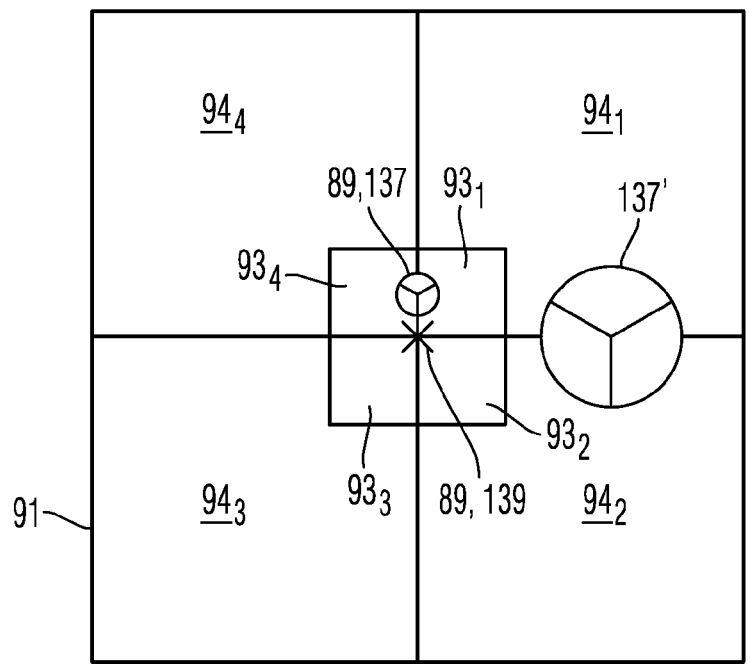

FIG. 11 shows a situation achieved after successful homing of the target, wherein the spot 89,139 generated by the active target 139 is located and maintained at the center 96 of the detector 91.

After successful homing of the target, the control system 29 switches to a different control mode which is referred to as a "tracking mode" in the following and in which distance measurements and angle measurements are performed relative to the reflector 137.

In the tracking mode, the horizontal and vertical error signals $S_h$, $S_v$ for generating the control signals for operating the actuators 27 and 33, respectively are generated as follows:

$$S_h = S_h^{ca} \quad (5)$$

$$S_v = S_v^{cp} \quad (6)$$

Figure 12:
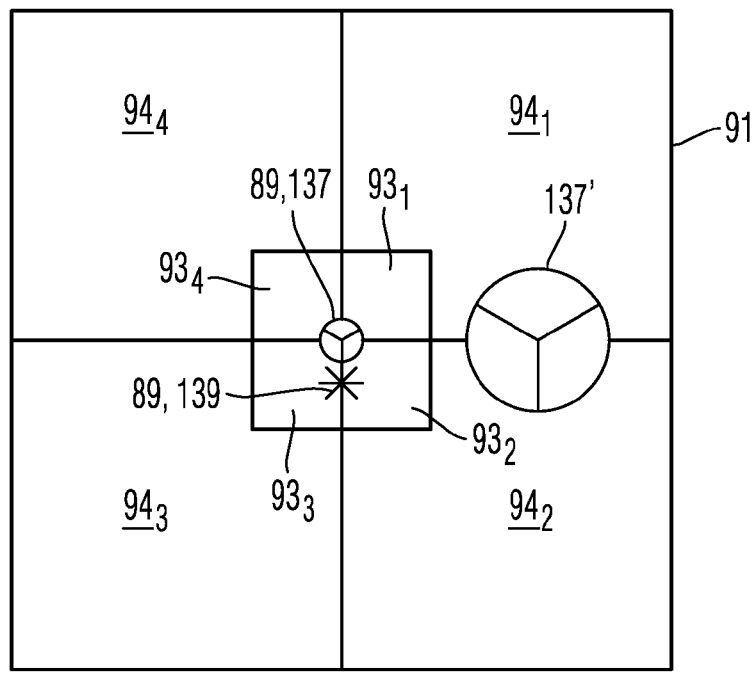

This results in an arrangement of spots 89,139 and 89,137 as shown in FIG. 12. Since the control of the orientation of the measuring unit 25 in the vertical angular direction is based on the passive target 137 and since the control of the orientation of the measuring unit 25 in the horizontal angular direction is based on the active target 139, the spot 89,137 generated by the passive target 137 will be located at the center 96 of the detector 91 whereas the spot 89,139 generated by the active target 139 will be located slightly below the center 96 of the detector 91 but substantially centered on the vertical insulating barrier 95.

Under such automatic processing in the tracking mode, the operation of the actuators 27 and 33 under control of the control system 29 will continuously reorient the measuring unit 25 such that the spot 89,137 generated by the passive target 137 will be maintained at the center 96 of the detector 91 even when the combined target 131 is moving. For example, combined target 131 can be mounted on a moving vehicle, and the surveying instrument will automatically track the moving target and may continuously perform distance measurements to the moving target using the electro-optical distance measuring system 41, and the surveying instrument 1 may also perform angle measurements relative to the reflector 137 using the encoders 31 and 36.

If, for some reason, such as sudden rapid movement of the target, wherein the operation of the actuators may not follow such rapid movement, the spot formed by the passive target 137 leaves the central group of detector segments 93, the processing will switch to the homing mode, such that the procedure as illustrated with reference to FIGS. 10, 12 and 13 above is again performed to switch then back to the tracking mode.

The above illustrated method of tracking the combined target 131 is relatively robust against false tracking of undesired target which might accidentally appear within the field of view of the detector 91. This is in particular achieved by generating the control signal for orienting the measuring unit in one angular direction, which is the horizontal direction in the illustrated example, from light having a first modulation time pattern, which is the modulation time pattern of the active target in the present example, and generating the control signal for reorienting the measuring unit in the other direction, which is the vertical direction in the present example, from light modulated according to a different, first modulation time pattern, which is a modulation time pattern of the passive target in the present example.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

In the embodiment illustrated with reference to FIGS. 1 to 12, the active target is used for controlling the orientation of the measuring unit in the horizontal direction, and the passive target is used for controlling the orientation of the measuring unit 25 in the vertical direction. However, the present invention is not limited to such control.

Figure 13:
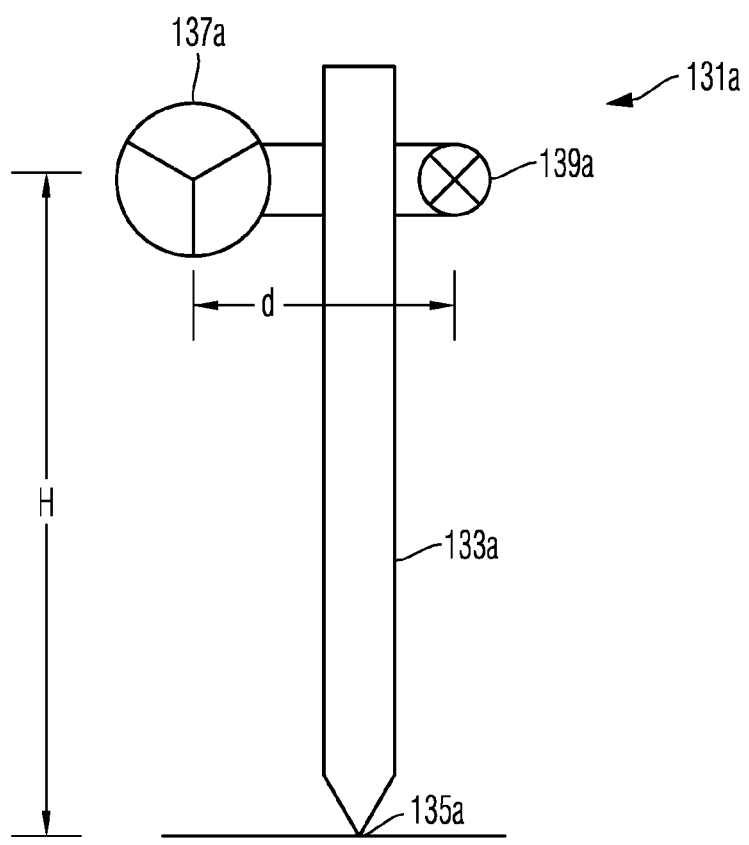
FIG. 13 is a schematic illustration of a further target which may be used in embodiments of the present invention.

FIG. 13 shows a suitable combined target 131*a* which can be used in combination with a surveying instrument according to a further embodiment of the present invention.

The combined target 131*a* shown in FIG. 13 comprises a pole 133*a* having a lower end 135*a*, wherein a reflector 137*a* forming a passive target is disposed at a distance H from the lower end 135*a* of the pole 133*a*. A light source 139*a* emitting light modulated according to a predetermined time pattern is disposed at a same height H as reflector 137*a* from the lower end 135*a* of the pole 133*a* but at a horizontal distance (d) from a center of the reflector 137*a*.

Figure 14:
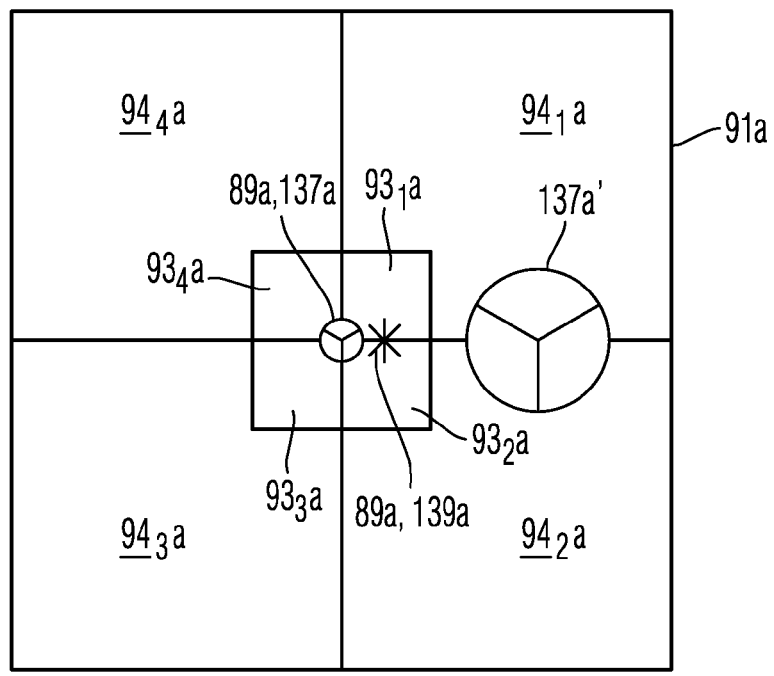
FIG. 14 is a schematic diagram for illustration of a method according to an embodiment of the invention involving the target shown in FIG. 13.

FIG. 14 shows an arrangement of spots generated on a detector 91*a* of a surveying instrument from light received from combined target 131*a*. In particular, an asterisk 89*a*, 139*a* represents a spot on the detector 91*a* formed of light emitted by the active target 139*a*, and a segmented circle 89*a*, 137*a* represents a spot of light received from the active target 137*a*.

In such situation, the control signals for operating the motors 33 and 27 may be advantageously derived from the following error signals:

$$S_h = S_h^{cp} \quad (7)$$

$$S_v = S_v^{ca} \quad (8)$$

In the above illustrated embodiments, the detector segments have an arrangement of a rectangular array having two rows and two columns. However, it is conceivable to choose other arrangements of detector segments in which three, five or more detector segments are suitably arranged and separated from each other by corresponding insulating barriers.

In the above illustrated embodiments, the orientation of the measuring unit is separately controlled in the horizontal and vertical directions. It is, however, also possible to perform separate control of the orientation of the measuring unit in other angular directions which are also not necessarily oriented perpendicularly with respect to each other.

Embodiments of a surveying instrument perform tracking of a target by controlling an orientation of a measuring unit relative to the target in two different angular directions. The control in one angular direction is based on detected light intensities which are modulated according to a first time pattern, and control of the orientation in the other angular direction is based on detected light intensities modulated according to a second time pattern just different from the first time pattern.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A method of controlling a surveying instrument, the surveying instrument comprising:
 a base, a measuring unit mounted relative to the base, and an actuator control unit for controlling an orientation of the measuring unit relative to the base, the measuring unit comprising a lens and a detector having plural detector segments;
 the method comprising:
 receiving first light through the lens and forming a first spot of the first light on the detector, wherein the first light is modulated light having an intensity which is modulated according to a first time pattern;
 receiving second light through the lens and forming a second spot of the second light on the detector, wherein the second light is modulated light having an intensity which is modulated according to a second time pattern;
 processing light intensity signals produced by the plural detector segments based on the first and second time patterns and generating a first control signal indicative of a position of the first spot on the detector, and a second control signal indicative of a position of the second spot on the detector;
 controlling, in a first control mode, the actuator control unit to change the orientation of the measuring unit relative to the base in a first angular direction based on the first signal and to change the orientation of the measuring unit relative to the base in a second angular direction based on the second signal.

2. The method according to claim 1, wherein the measuring unit comprises a first light source for generating light modulated according to the first time pattern, and wherein the method further comprises: emitting the light generated by the first light source towards a reflector and receiving light reflected from the reflector as the first light.

3. The method according to claim 2, wherein the second light is generated by a second light source disposed at a distance from the measuring unit, wherein the second light source is mounted on a pole and wherein the reflector is mounted on the pole.

4. The method according to claim 3, wherein the second light source is disposed at a distance from a center of the reflector.

5. The method according to claim 2, wherein the detector comprises four adjacent detector segments, wherein the controlling of the actuator control unit is performed such that one of the first and second spots covers the portions of the four detector segments and another one of the first and second spots covers two detector elements, and wherein the one spot covering the four detector segments is formed of light generated by the first light source.

6. The method according to claim 2, further comprising performing a distance measurement using measuring light emitted by the measuring unit and detecting measuring light reflected from the reflector.

7. The method according to claim 1, wherein the second light is generated by a second light source disposed at a distance from the measuring unit.

8. The method according to claim 7, wherein the second light source is mounted on a pole.

9. The method according to claim 7, wherein the detector comprises four adjacent detector segments, wherein the controlling of the actuator control unit is performed such that one of the first and second spots covers the portions of the four detector segments and another one of the first and second spots covers two detector elements, and wherein the other spot covering the two detector segments is formed of light generated by the second light source.

10. The method according to claim 1, wherein the controlling of the actuator control unit is performed such that at least one of the first and second spots covers a portion of a first detector segment and a portion of a second detector segment adjacent to the first detector segment.

11. The method according to claim 10, wherein the controlling of the actuator control unit is performed such that an intensity of the at least one of the first and second spots incident on the portion of the first detector segment is substantially equal to an intensity of the at least one of the first and second spots incident on the portion of the second detector segment.

12. The method according to claim 1, wherein the detector comprises four adjacent detector segments, wherein the controlling of the actuator control unit is performed such that at least one of the first and second spots covers a portion of each of the four detector segments.

13. The method according to claim 12, wherein the controlling of the actuator control unit is performed such that intensities of the at least one of the first and second spots on each of the four detector segments are substantially equal.

14. The method according to claim 12, wherein the controlling of the actuator control unit is performed such that one of the at least one of the first and second spots covers the portions of the four detector segments and another one of the at least one of the first and second spots covers two detector elements.

15. The method according to claim 1, wherein the plural detector segments comprise a central group of detector segments disposed in a central region of the detector, and a peripheral group of detector segments disposed in a peripheral region of the detector, and wherein the controlling of the actuator control unit to change the orientation of the measuring unit relative to the base is, in the first control mode, performed in dependence on light intensities detected by only the detector segments of the central group of detector segments.

16. The method according to claim 1, wherein the method further comprises:
 controlling, in a second control mode, the actuator control unit to change the orientation of the measuring unit relative to the base in both the first and second angular directions based on the second signal.

17. The method according to claim 16, wherein the plural detector segments comprise a central group of detector segments disposed in a central region of the detector, and a peripheral group of detector segments disposed in a peripheral region of the detector, and wherein the controlling is performed according to the second control mode when at least one of the first and second spots covers a portion of at least one detector segment of the peripheral group.

18. The method according to claim 17, wherein the controlling is performed according to the first control mode when at least one of the first and second spots covers a portion of at least one detector segment of the central group.

19. The method according to claim 17, wherein the controlling is performed according to the first control mode when both of the first and second spots cover a portion of at least one detector segment of the central group.

20. The method according to claim 1, wherein at least one of the first light and the second light is modulated at a predetermined frequency.

21. The method according to claim 20, wherein the processing of the light intensity signals comprises quadrature processing.

22. The method according to claim 1, further comprising performing a distance measurement using measuring light emitted by the measuring unit.

23. A surveying instrument configured to perform the method as defined in claim 1.

24. A computer-readable carrier containing information representing a program adapted to cause a control system of a surveying instrument to execute the method according to claim 1, wherein the computer readable carrier is at least one of a group consisting of a solid state memory, a magnetic memory, and an optical memory.

25. A method comprising the step of transmitting information representing a program adapted to cause a control system of a surveying instrument to execute the method according to claim 1.

26. A surveying instrument comprising:
a base;
a measuring unit mounted relative to the base, the measuring unit comprising a lens and a detector having plural detector segments;
a actuator control unit for controlling an orientation of the measuring unit relative to the base; and
a control system for controlling the actuator control unit, wherein the control system is configured for processing light intensity signals produced by the plural detector segments based on first and second time patterns and generating a first control signal indicative of a position of a first spot of first light on the detector, and a second signal indicative of a position of a second spot of second light on the detector; and
wherein the control system is further configured for controlling, in a first control mode, the actuator control unit to change the orientation of the measuring unit relative to the base in a first angular direction based on the first signal and to change the orientation of the measuring unit relative to the base in a second angular direction based on the second signal.

27. The surveying instrument according to claim 26, further comprising a distance measuring unit.

28. The surveying instrument according to claim 26, wherein the detector is a four-quadrant type detector.

* * * * *

UNITED STATES PATENT AND TRADEMARK OFFICE
CERTIFICATE OF CORRECTION

| | |
|---|---|
| PATENT NO. | : 7,640,068 B2 |
| APPLICATION NO. | : 11/767742 |
| DATED | : December 29, 2009 |
| INVENTOR(S) | : Johan Johnson et al. |

It is certified that error appears in the above-identified patent and that said Letters Patent is hereby corrected as shown below:

Col. 6, Line 55 "$94_4$," should read --$94_4$--;

Col. 7, Line 45 "$93_1$" should read --$93_1$.--; and

Col. 7, Line 63 "intensity 10" should read --intensity $I_0$--.

Signed and Sealed this

Twenty-sixth Day of October, 2010

David J. Kappos
*Director of the United States Patent and Trademark Office*